Figure 1:
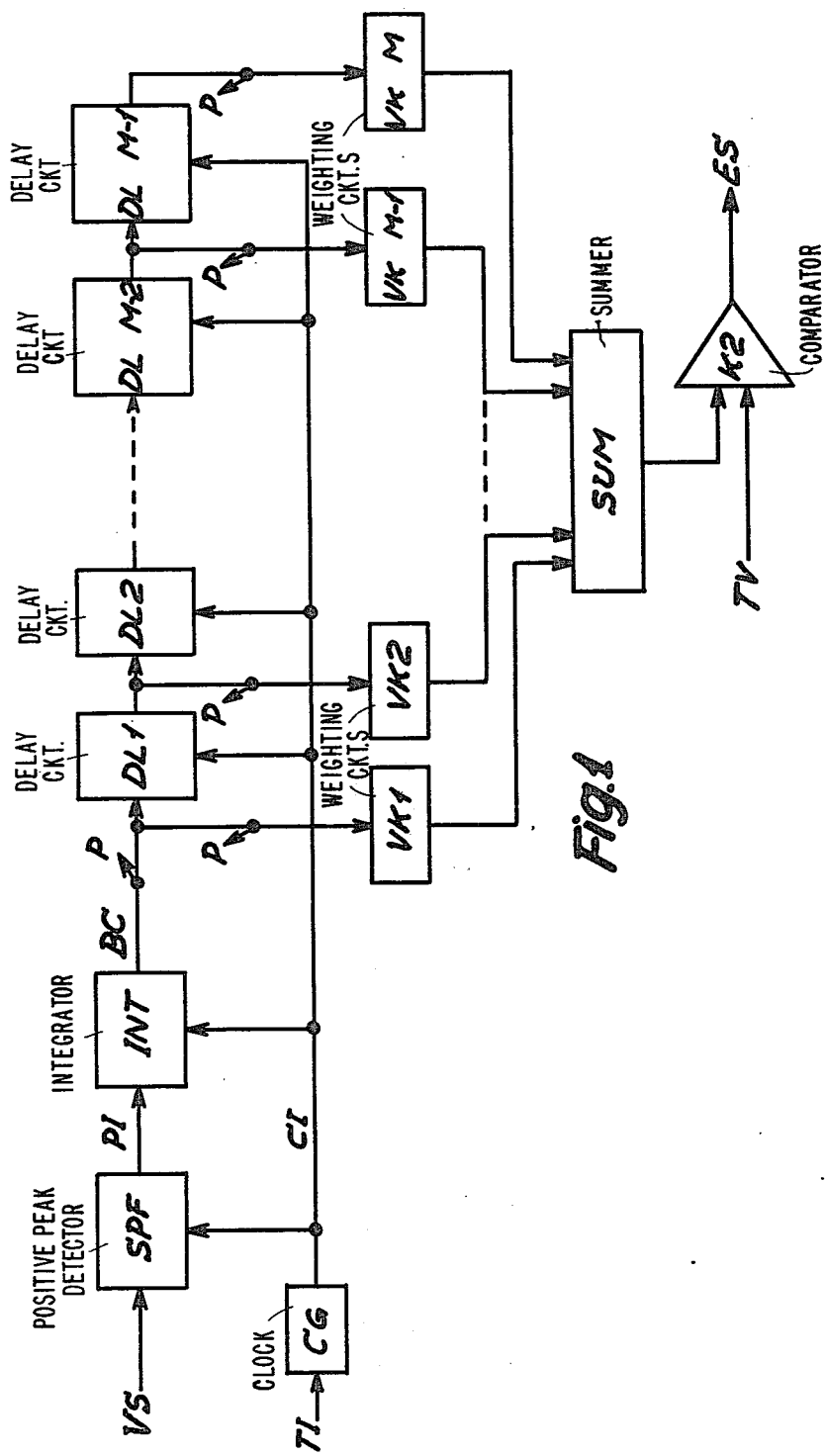

United States Patent [19]

Seiersen

[11] 4,148,025
[45] Apr. 3, 1979

[54] APPARATUS FOR DETECTING ECHO SIGNALS

[75] Inventor: Ole S. Seiersen, Kokkedal, Denmark

[73] Assignee: Christian Rovsing A/S, Herlev, Denmark

[21] Appl. No.: 780,448

[22] Filed: Mar. 23, 1977

[30] Foreign Application Priority Data

Mar. 24, 1976 [DK] Denmark .............................. 1296/76

[51] Int. Cl.² .............................................. G01S 9/02
[52] U.S. Cl. .................................................. 343/5 VQ
[58] Field of Search ...................................... 343/5 VQ

[56] References Cited

U.S. PATENT DOCUMENTS

| | | | |
|---|---|---|---|
| 3,223,999 | 12/1965 | Groginsky | 343/17.1 R |
| 3,438,034 | 4/1969 | Carre et al. | 343/5 VQ |
| 3,531,802 | 9/1970 | Brown et al. | 343/5 VQ |
| 3,680,096 | 7/1972 | Bosc | 343/5 DP X |
| 3,683,380 | 8/1972 | Cantwell, Jr. et al. | 343/5 VQ X |
| 3,778,822 | 12/1973 | Bauer | 343/5 R |
| 3,868,685 | 2/1975 | Wilmot | 343/5 DP |

Primary Examiner—Malcolm F. Hubler
Attorney, Agent, or Firm—Fleit & Jacobson

[57] ABSTRACT

Apparatus for detecting radar echo signals with a high degree of certainty in the presence of noise. A predetermined number of consecutive, constantly changing intervals are produced having a length equal to the radar pulse width. The resolution of the system is a function of the number of signal positions chosen for examination within each interval. A secondary signal is produced for each signal position and these secondary signals are summed over preselected resolution intervals. A weighting arrangement is provided which weights the individual secondary signals inversely with their distance from the central resolution interval of the set.

3 Claims, 6 Drawing Figures

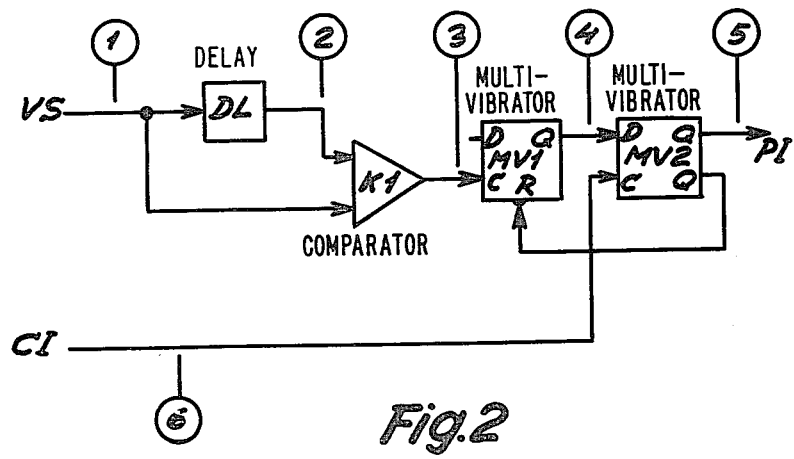
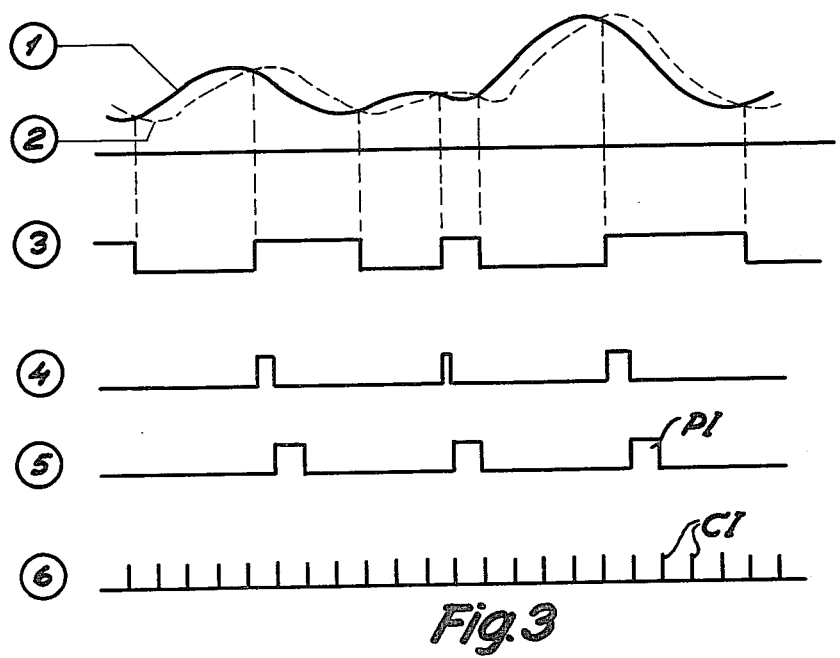

APPARATUS FOR DETECTING ECHO SIGNALS

The invention relates to an apparatus for detecting echo signals produced by reflection of pulses transmitted with a given time period T and a given pulse width τ. Such apparatus are used primarily for echo detection in radar installations, and in constructing them it is endeavoured to render them capable of distinguishing echo signals from noise with the highest possible degree of certainty.

One prior known detector is a so-called parametric detector which is based on the assumption that the noise distribution is known beforehand and that it is therefore possible to calculate the threshold value that will provide a pre-determined probability of avoiding false echoes, i.e. a so-called false alarm probability. The prior art also comprises adaptive parametric detectors containing circuits trying to bring about the optimum detection capability in spite of possible variation in the noise distribution, e.g. due to clutter or interference.

Still another known type of detector is a non-parametric detector arranged to maintain a constant false alarm probability independent of the noise distribution. Such detector bases the detection criteria on a comparison of the instantaneous value of the video signal with a number of sensed values of the surrounding noise. The more sensed noise values are included, the better the detection capability will be; but the slower will also be the response to quick changes in the noise distribution.

The prior art also includes a non-parametric detector which compares the polarity of the video signal in a given distance resolution element corresponding to a pulse width over a number of consecutive pulse periods. Such detector is known as a polarity detector. It has low response time, but relatively poor detection capability.

The object of the invention is to provide an apparatus of the type concerned, said apparatus having both low response time and good detection capability.

Said object is achieved by the apparatus according to the invention in which means are provided for determining, with a resolution of t/M wherein t is essentially equal to the pulse width and M is at least three, signal positions within each of a pre-determined number N of consecutive, constantly changing equidistant intervals with the period T and the length t, and for producing, for each signal position ascertained, a secondary signal in a corresponding resolution interval of t/M, and means for currently summing up the secondary signals produced in the last N·M resolution intervals with such weighting that the individual secondary signals in a set of M resolution intervals are given a weight which depends on their distance from the central resolution interval of the set, said weight decreasing with increasing distance.

By said construction, which undertakes, like the polarity detector, a comparison of signal conditions over a number of consecutive pulse periods is obtained a measure of the signal distribution within a pulse width. It only noise with random amplitude and phase is present, there will be a rectangular signal distribution in a distance resolution element during a number of consecutive pulse periods, whereas the presence of an echo signal in a distance resolution element will cause a Gaussian signal distribution during a number of consecutive pulse periods with a variance decreasing with increasing signal-to-noise ratio. This distribution having a tendency towards signal concentration about the centre, is emphasized by the weighting process also taking place in the apparatus defined.

According to a specific embodiment of the invention said means for determining signal position comprise a delay circuit and a comparator connected therewith, said comparator producing a binary output signal which changes condition every time the delayed signal and the non-delayed signal assume the identical value, and said signal is supplied to a trigger circuit, to which clock pulses are also supplied and which is arranged in such a way that it issues, with each shift in one direction of the output signal of the comparator, a position pulse beginning at the first clock pulse after the shift and having a duration of one clock pulse period, said position pulse forming said secondary signal.

Said embodiment comprises a simple arrangement of the means for determining signal positions by means of digital circuits producing with each signal a position pulse during a clock period which defines the resolution t/M.

Another embodiment of the invention is characterized by an apparatus comprising an integrating circuit to which are supplied the secondary signals produced and which consists of (N-1) delay circuits arranged to delay the signals received by their respective multiple of the pulse period T, and a converter to which is supplied at any time the non-delayed secondary signals, said converter producing on a number P of outputs binary signals which indicate the number of secondary signals received. By this arrangement appropriate circuits are achieved for simultaneous indication of the signal position in N equidistant resolution intervals having the time period T.

According to still another embodiment the (N-1) delay circuits are composed of series coupled shift registers controlled by the clock pulses, said arrangement being particularly suited for digital signal processing.

The above enumeration of embodiments is not exhaustive, and other features of the invention will be described below.

Figure 4:
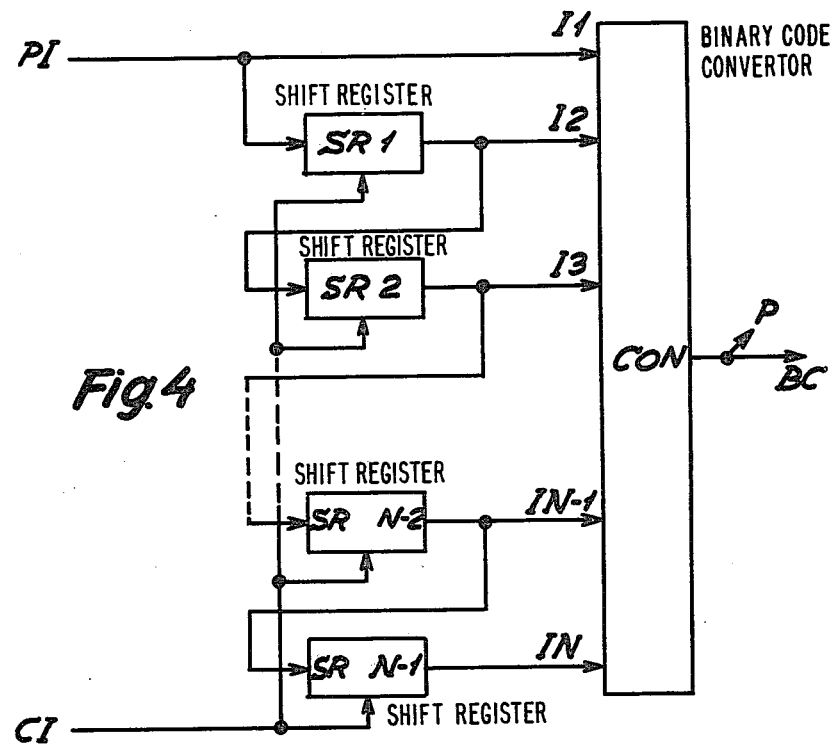
Figure 5:
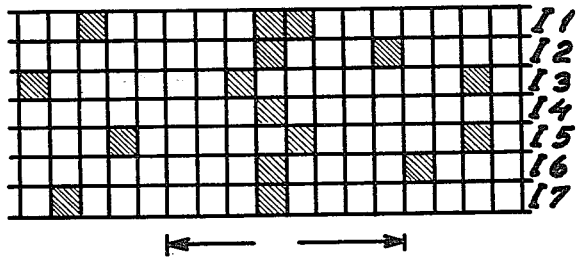
Figure 6:

The invention is explained in more detail below with reference to the drawing, wherein FIG. 1 represents a block diagram of an embodiment of the apparatus according to the invention, FIG. 2 represents a block diagram of one of the circuit blocks forming part of the apparatus and which serves to determine the signal position, FIG. 3 is a graphical representation showing signal conditions at various points of the circuit shown in FIG. 2, FIG. 4 is a block diagram of another of the circuit blocks forming part of the apparatus, and which serves to indicate simultaneously the signal positions in equidistant resolution intervals, FIG. 5 is a diagram illustrating a specific signal distribution in a section of resolution interval sets, in which the intervals in each vertical set represent mutually time displaced equidistant resolution intervals, and FIG. 6 is a diagram showing the signal pattern illustrated in FIG. 5 converted into binary code signals on three lines.

In FIG. 1 SPF is a circuit for determination of the position of positive signal humps in video signals supplied, said video signals being imagined in this instance to be a mixture of radar echo signals and noise. The pulse period of the radar installation is assumed to be T and the pulse width τ, which defines the distance resolution of the installation. CG is a clock pulse generator to which are fed trigger pulses TI and which issues clock pulses dividing the pulse width $\tau$ into a number M of resolution intervals each of which are getting a length of $\tau/M$. The leading edge of each radar pulse transmitted determines the time position of a trigger pulse TI and hence of a clock pulse.

The circuit SPF can be constructed as illustrated in FIG. 2 and consist of a delay circuit DL, a comparator K1 and two bistable multivibrators MV1 and MV2. The signal voltages at the points numbered 1-6 in FIG. 2 are shown in FIG. 3, in which they have been correspondingly numbered 1-6. The video signal VS numbered 1 is supplied to the delay circuit DL and to one input to the comparator K1, to the other input of which are supplied the delayed video signals numbered 2 from the output of the delay circuit. The comparator K1 is a bistable apparatus changing state every time the delayed video signal and the original video signal have identical amplitude, as will appear from the curve numbered 3 showing the output voltage of the comparator. Said output voltage, which is positive when the delayed video signal has larger amplitude than the non-delayed, is fed to the clock input C of the multivibrator MV1 which is set by each edge extending in a positive direction and issues pulses on its Q-output as indicated by the curve numbered 4. These pulses are fed to the D-input of said other multivibrator MV2 which is hereby prepared for being set by the next of the clock pulses numbered 6. By said setting the voltage numbered 5 on the Q-output of the multivibrator MV2 changes to produce a signal position pulse PI. The conjugate pulse produced simultaneously on the $\overline{Q}$-output of the multivibrator MV2 is supplied to the reset input R of the multivibrator MV1 which is thereby reset and prepares the multivibrator MV2 to be reset by the next clock pulse CI. Each position pulse PI thus has a length of one clock pulse period which is identical with the previously mentioned resolution interval. It will be seen that each hump in the video signal VS results in the production of a corresponding position pulse PI with a phase depending on the delay in the delay circuit DL. Usually, a delay being materially greater than suggested in FIG. 3, e.g. equal to the pulse width $\tau$, will provide the best results.

As shown in FIG. 1 the position pulses PI are fed to an integrating circuit INT to which are also fed the clock pulses CI, said integrating circuit being constructed e.g. as indicated in FIG. 4. In said embodiment the integrator comprises a number (N-1) of series coupled shift registers SR1-SR(N-1) stepped forward by the clock pulses CI and a converter CON. Each shift register has a length corresponding to the number of resolution intervals or clock pulse periods per radar pulse period T. The converter CON has N inputs I1-IN, to one I1 of which are supplied the non-delayed position pulses PI while each of the other inputs receive position pulses from their respective shift register, said pulses being delayed 1, 2, (N-2) and (N-1) radar pulse periods T, respectively. At any given time a simultaneous representation of the video signals detected in the resolution interval concerned and in the (N-1) preceding resolution intervals, which are spaced the period T apart, will thus be present on the inputs I1-IN.

An example of a position signal distribution in the event of six shift registers and hence seven inputs to the converter CON being provided is shown in FIG. 5, wherein each horizontal row represents an input I1-I7 and the horizontal time axis is divided into clock periods or resolution intervals $\tau/M$. A signal position pulse on a given input in a given clock period has been marked by filling in the square in question. In FIG. 5 the radar pulse width $\tau$ in case of $M=8$ has also been marked.

The converter CON is arranged as is generally known to convert the digital signals on the inputs I1-IN into binary code signals BC on a number of P outputs in such a way that the signal combination on these outputs at any time indicates the number of position signals on the inputs. This number may assume any value from 0 to N.

In the case shown in FIG. 5 the maximum number of position signals occurring is seven, which may be repesented binarily at three outputs. The signal combination on three such outputs corresponding to the position pulse distribution shown in FIG. 5 is illustrated in FIG. 6, wherein each of the horizontal rows correspond to their respective output and represent the binary figures $2^o$, $2^1$, and $2^2$, respectively.

As indicated in FIG. 1 each of the P outputs from the integrator INT are connected to their respective delay chain consisting of a number M-1 of series coupled links DL1-DL (M-1) which the binary information passes through step by step at intervals defined by the clock pulses CI. In this way the effect is achieved that the binary information in each of the M-intervals into which the radar pulse width T is resolved will be available in parallel form.

This binary information is fed to a summation circuit SUM through weighting circuits VK1-VKM in such a way that the information in each interval is given a pre-determined weight. The weighting is effected symmetrically in such a way that the binary information originating from the centermost of the delay chains is given the greatest weight, and the information from the end of the chains, i.e. the information passing through the weighting circuits VK1 and VKM, the smallest weight.

The weighting function may e.g. be approached to a normal distribution function, whereby an optimum detection capability with Gaussian noise distribution is achieved.

The weighted values are summed up in the circuit SUM, and the sum signal is supplied to a comparator K2 in which it is compared with a threshold value signal TV which is also fed to the comparator. When the sum signal surpasses the threshold value, the comparator K2 delivers an echo signal ES on its output.

It will be seen that the sum signal will assume lower values when only random signal position pulses originating from noise are present, and that the sum signal increases with decreasing spreading within the radar pulse width of the video signals received.

In the above description of the embodiment of the apparatus according to the embodiment shown in the drawing it is stated that the clock pulses divide a radar pulse width $\tau$ into a number M of resolution intervals which are thus given the length $\tau/M$. This is not necessary, however. Generally an interval t being essentially equal to the pulse width $\tau$ is divided into M resolution intervals each having the length $\tau/M$.

In the digital embodiment of the apparatus shown and described the weighting circuits VK may be composed of read-only stores, and the circuit SUM may be composed of an ordinary, binary addition circuit. The various functions carried out in the apparatus according to the invention, however, may also take the form of analogous processes in which case the various delay circuits must naturally also be carried out as analogous circuits like the weighting circuits, which may be composed of resistance network, and the summation circuit.

The non-recursive integrator shown in FIG. 4 may also be replaced by other integrating circuits. It will e.g. be advantageous to use a recursive integrator type when the number of radar pulse periods to be integrated over is large, seeing that the number of shift registers is then not increased in proportion to the number of pulse periods, as is the case with the non-recursive type.

What I claim is:

1. An apparatus for detecting echo signals produced by reflection of pulses transmitted with a given time period T and a given pulse width $\tau$, characterized by means (SPF) for determining, with a resolution of t/M wherein t is essentially equal to the pulse width $\tau$ and M is at least three, signal positions within each of a predetermined number N of consecutive, constantly changing equidistant intervals with the period T and the length t, and for producing, for each signal position ascertained, a secondary signal (PI) in a corresponding resolution interval of t/M, and means (DL1–DL(M-1), VK1–VKM, SUM) for currently summing up the secondary signals produced in the last N·M resolution intervals with such weighting that the individual secondary signals in a set of M resolution intervals are given in a weight which depends on their distance from the central resolution interval of the set, said weight decreasing with increasing distance, wherein said means for determining signal positions comprise a delay circuit (DL) and a comparator (K1) connected therewith, said comparator producing a binary output signal (3) which changes condition every time the delayed signal (2) and the non-delayed signal (1) assume identical value, and that said signal (3) is supplied to a trigger circuit (MV1, MV2), to which clock pulses (CI) are also supplied and which is arranged in such a way that it issues, with each shift in one direction of the output signal of the comparator, a position pulse (PI) beginning at the first clock pulse after the shift and having a duration of one clock pulse period, said position pulse forming said secondary signal.

2. An apparatus according to claim 1, characterized in that it comprises an integrating circuit (INT) to which are successively supplied the secondary signals (PI) produced and which consists of (N-1) delay circuits (SR1–SR(N-1)) arranged to delay the received signals by their respective multiple of the pulse period T, and a converter (CON) to which is supplied at any time the non-delayed and the delayed secondary signals, said converter producing on a number P of outputs binary signals (BC) which indicate the number of secondary signals received (FIG. 4).

3. An apparatus according to claim 2, characterized in that the (N-1) delay circuits are comprised of shift registers (SR1–SR(N-1)) arranged in series, each shift register having an output connected to a separate input of said converter and having an input connected to the output of the preceding register, said shift registers being controlled by the clock pulses (CI).

* * * * *